(12) United States Patent
Kou et al.

(10) Patent No.: US 12,098,035 B1
(45) Date of Patent: Sep. 24, 2024

(54) BRAKING DEVICE

(71) Applicants: TAIYUAN UNIVERSITY OF TECHNOLOGY, Taiyuan (CN); LIBO HEAVY INDUSTRIES SCIENCE & TECHNOLOGY CO., LTD., Tai'an (CN); TAIYUAN BOSHITONG MACHINE ELECTRICITY LIQUID ENGINEERING CO., LTD., Taiyuan (CN)

(72) Inventors: Ziming Kou, Taiyuan (CN); Yuan Zhang, Taiyuan (CN); Junxia Li, Taiyuan (CN); Shaoni Jiao, Taiyuan (CN); Xin Li, Taiyuan (CN); Fan Zhao, Taiyuan (CN); Changzheng Sun, Taiyuan (CN); Jiabao Xue, Taiyuan (CN); Yahu Wang, Taiyuan (CN)

(73) Assignees: TAIYUAN UNIVERSITY OF TECHNOLOGY, Taiyuan (CN); LIBO HEAVY INDUSTRIES SCIENCE & TECH. CO., LTD., Tai'an (CN); TAIYUAN BOSHITONG MACH. ELEC. LIQ. ENG'G CO., LTD., Taiyuan (CN)

( * ) Notice: Subject to any disclaimer, the term of this patent is extended or adjusted under 35 U.S.C. 154(b) by 0 days.

(21) Appl. No.: 18/679,387

(22) Filed: May 30, 2024

Related U.S. Application Data (63) Continuation of application No. PCT/CN2021/141848, filed on Dec. 28, 2021.

(30) Foreign Application Priority Data

Dec. 24, 2021 (CN) .......................... 202111600919.0

(51) Int. Cl.
  *B65G 23/02* (2006.01)
  *B65G 43/06* (2006.01)

(52) U.S. Cl.
  CPC ............. *B65G 23/02* (2013.01); *B65G 43/06* (2013.01)

(58) Field of Classification Search
  CPC ............................... B65G 43/06; B65G 23/02
  (Continued)

(56) References Cited

U.S. PATENT DOCUMENTS

| | | | | |
|---|---|---|---|---|
| 2,631,717 A | * | 3/1953 | Cox ...................... | B65G 43/00 198/832.3 |
| 4,314,631 A | * | 2/1982 | Hagerman ............. | B65G 43/06 226/149 |

(Continued)

FOREIGN PATENT DOCUMENTS

| CN | 2175209 Y | 8/1994 |
|---|---|---|
| CN | 202176366 U | 3/2012 |

(Continued)

*Primary Examiner* — Mark A Deuble

(57) ABSTRACT

A braking device for braking a belt of a downward belt conveyor adopting a head drive is provided. The belt includes first and second belt surfaces opposite to each other. The braking device includes a first clamping plate arranged at a side of the first belt surface, and a second clamping plate arranged at a side of the second belt surface. The first and second clamping plates are configured to move toward each other to allow the second clamping plate and the first clamping plate respectively abut against the second belt surface and the first belt surface, so as to clamp the belt to achieve the braking. The first and second clamping plates are configured to move away from each other to release the belt.

7 Claims, 5 Drawing Sheets

(58) Field of Classification Search
USPC .............................. 198/832.3; 118/65.1–65.5
See application file for complete search history.

(56) References Cited

U.S. PATENT DOCUMENTS

| | | | |
|---|---|---|---|
| 4,609,100 A * | 9/1986 | Fudickar ................. | B65G 23/44 |
| | | | 100/270 |
| 5,092,444 A | 3/1992 | Agnoff | |
| 5,188,218 A * | 2/1993 | Kuzik .................... | B65G 15/00 |
| | | | 198/832.3 |
| 2016/0090243 A1 | 3/2016 | Aliesch | |

FOREIGN PATENT DOCUMENTS

| | | |
|---|---|---|
| CN | 204847156 U | 12/2015 |
| CN | 206606677 U | 11/2017 |
| CN | 208345176 U | 1/2019 |
| CN | 109368145 A | 2/2019 |
| CN | 110654806 A | 1/2020 |
| CN | 110789956 A | 2/2020 |
| CN | 211249729 U | 8/2020 |
| CN | 213355872 U | 6/2021 |
| DE | 4308256 C1 | 11/1994 |

* cited by examiner

BRAKING DEVICE

CROSS-REFERENCE TO RELATED APPLICATIONS

This application is a continuation of International Patent Application No. PCT/CN2021/141848, filed on Dec. 28, 2021, which claims the benefit of priority from Chinese Patent Application No. 202111600919.0, filed on Dec. 24, 2021. The content of the aforementioned application, including any intervening amendments made thereto, is incorporated herein by reference in its entirety.

TECHNICAL FIELD

This application relates to braking techniques for belt conveyors, and more particularly to a braking device.

BACKGROUND

For the downward belt conveyors with a large slope angle, a reliable braking system is necessary to achieve the smooth and controlled braking of the conveyor. Most of the existing belt conveyors employ a disc brake to slow down the drive roller. For the belt conveyors adopting a head drive, such as trough conveyors, in the case of only braking the drive roller, the belt and the materials thereon will continue to move downward due to inertia, thereby leading to the occurrence of "loss of speed control" and stacking ("loss of speed control" refers to the phenomenon of uncontrollable speed increase of the belt conveyor, eventually leading to abnormal unloading and equipment damage). The prior art also introduces a friction block to apply friction to the lower surface of the upper belt of the belt conveyor to achieve the braking. However, the single-side braking may suffer insufficient and uncontrollable braking force, and fails to effectively prevent the "loss of speed control" and stacking accidents.

SUMMARY

In view of this, an object of this application is to provide a reliable braking device for belt conveyors.

To achieve the object, the present application provides a braking device for braking a belt of a belt conveyor, the belt comprising a first belt surface and a second belt surface opposite to each other, and the braking device comprising:
  a first clamping plate; and
  a second clamping plate;
  wherein the first clamping plate is provided on a side of the first belt surface away from the second belt surface; the second clamping plate is provided on a side of the second belt surface away from the first belt surface; the first clamping plate and the second clamping plate are configured to move toward each other such that the second clamping plate abuts against the second belt surface and the first clamping plate abuts against the first belt surface, thereby clamping the belt to brake the belt; the first clamping plate and the second clamping plate are further configured to move away from each other to release the belt;
  the second clamping plate is configured to move toward or away from the first clamping plate to clamp the belt, or release the belt; the braking device further comprises a drive component; the drive component is connected to the second clamping plate, and configured to drive the second clamping plate to move toward or away from the first clamping plate;
  the braking device further comprises a box; two ends of the box in a lengthwise direction or a widthwise direction are each provided with an opening; the first clamping plate is provided inside the box; the second clamping plate is slidably provided in the box; the second clamping plate is configured to move toward or away from the first clamping plate along a height direction of the box; the belt is configured to pass between the first clamping plate and the second clamping plate through the opening;
  the braking device further comprises a first airbag; the first airbag is connected to a side of the first clamping plate away from the belt, and configured to provide cushion between the first clamping plate and the belt; and/or
  the braking device further comprises a second airbag connected to a side of the second clamping plate away from the belt, and the second airbag is configured to provide cushion between the second clamping plate and the belt.

In an embodiment, a width of the first clamping plate is greater than a width of the first belt surface; and
  a width of the second clamping plate is greater than a width of the second belt surface.

In an embodiment, a first friction component is provided on a side of the first clamping plate facing toward the first belt surface, and is configured to abut against the first belt surface; and/or
  a second friction component is provided on a side of the second clamping plate facing toward the second belt surface, and is configured to abut against the second belt surface.

In an embodiment, the drive component is a pneumatic cylinder;
  the braking device further comprises a proportional flow control valve;
  the proportional flow control valve is connected to the drive component; and
  the proportional flow control valve is configured to adjust an air pressure of the pneumatic cylinder, so as to adjust a driving force output from the drive component to the second clamping plate.

In an embodiment, an inner wall of the box is provided with a sliding groove;
  the sliding groove is configured to extend along a movement direction of the second clamping plate;
  the second clamping plate is provided with a protruding part;
  the protruding part is slidably provided inside the sliding groove to allow a sliding connection between the second clamping plate and the box; and
  the second clamping plate is configured to move toward or away from the first clamping plate along the sliding groove.

In an embodiment, the braking device further comprises a resilient component;
  the resilient component is provided inside the box;
  a first end of the resilient component is connected to the box,
  a second end of the resilient component is connected to the second clamping plate; and
  the resilient component is configured to apply an elastic force to the second clamping plate in a direction toward the first clamping plate.

In an embodiment, the braking device further comprises a support roller; and the support roller is configured to abut against the second belt surface, so as to support the belt.

Technical solutions of this application are specifically described as follows. When it is necessary to brake the belt of the belt conveyor, the first clamping plate and the second clamping plate move in a direction close to each other, so that the second clamping plate abuts against the second belt surface of the belt, and the first clamping plate abuts against the first belt surface of the belt, so that the first clamping plate and second clamping plate clamp the belt to achieve the braking of the belt. When the braking of the belt needs to be released, the first clamping plate and second clamping plate move in a direction far away from each other to separate the first clamping plate from the first belt surface, and the second clamping plate also separates from the second belt surface, so that the first clamping plate and the second clamping plate can release the clamping of the leather belt. This application directly applies the first clamping plate and second clamping plate to the belt. The belt is clamped on both sides, thereby achieving double-sided braking of the belt. Therefore, this application enables the reliable braking of the belt, avoiding accidents such as runaway and belt stacking accidents. The braking device and method of the present application address the challenge in the braking of belt conveyors adopting the head drive.

BRIEF DESCRIPTION OF THE DRAWINGS

In order to clarify the technical solutions of the embodiments of the present disclosure or the prior art, a brief introduction to the drawings required in the embodiments or the prior art will be provided below. It should be understood that the following drawings only illustrate specific embodiments of the present disclosure and should not be construed as limiting the scope of the disclosure. For those skilled in the art, other related drawings can be obtained based on these drawings without making creative effort.

In the above figures, 100—braking device; 110—first clamping plate; 120—second clamping plate; 121—protruding part; 130—drive component; 140—proportional flow control valve; 150—controller; 160—box; 161—sliding groove; 170—first airbag; 180—second airbag; 190—resilient component; 1100—support roller; 200—belt conveyor; 210—belt; 211—first belt surface; 212 second belt surface; 213—upper belt; 214—lower belt.

The objectives, functional features, and advantages of the present application will be further explained below in conjunction with the embodiments and the accompanying drawings.

DETAILED DESCRIPTION OF EMBODIMENTS

The present disclosure will be described in further detail below with reference to the accompanying drawings and embodiments. It is understood that the embodiments described below are merely preferred embodiments of the present disclosure. For those skilled in the art, other embodiments obtained according to these embodiments of the present disclosure without making creative effort shall fall within the scope of the present disclosure defined by the appended claims.

It should be noted that in the description of the embodiments, the orientation indications such as "upper", "lower", "left", "right", "front", "rear", etc., are used to explain positional relationships and movement of the components in a specific configuration (as shown in figures). If the specific configuration changes, the directional indications will also change accordingly. Furthermore, the descriptions involving "first," "second," etc., are only for descriptive purposes and should not be understood as indicating or implying relative importance or implicitly specifying the number of technical limitations. Therefore, limitations designated as "first" and "second" can explicitly or implicitly include at least one of these limitations. Additionally, "and/or" herein includes three scenarios. Taking A and/or B as an example, it includes the technical scheme of A, the technical scheme of B, and the technical scheme including both A and B. Moreover, the technical solutions of various embodiments can be combined, but such combinations must be based on what those skilled in the art can implement. If the combination of technical solutions results in contradictions or cannot be implemented, it should be considered that such a combination does not exist, and is not within the scope of the present disclosure defined by the appended claims.

Figure 1:
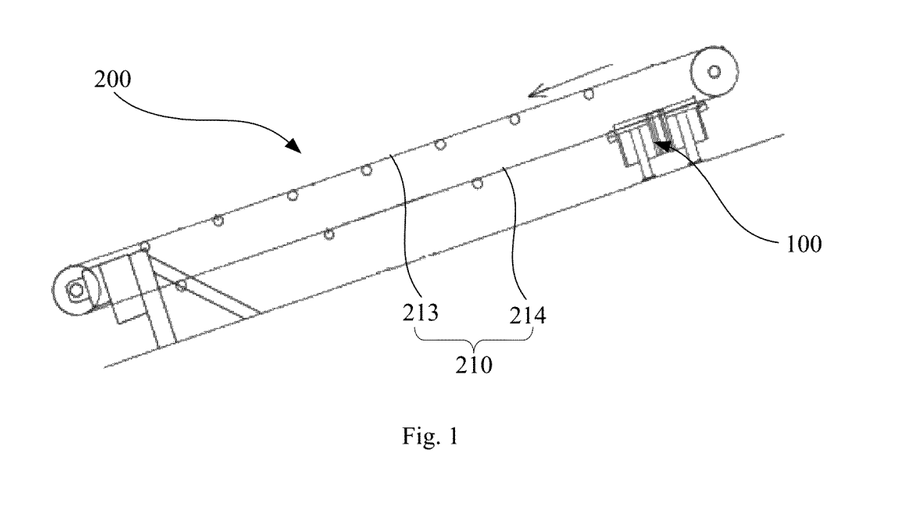
FIG. 1 is a schematic diagram of the structure of the braking device in conjunction with a belt conveyor according to an embodiment of the present disclosure.
Figure 2:
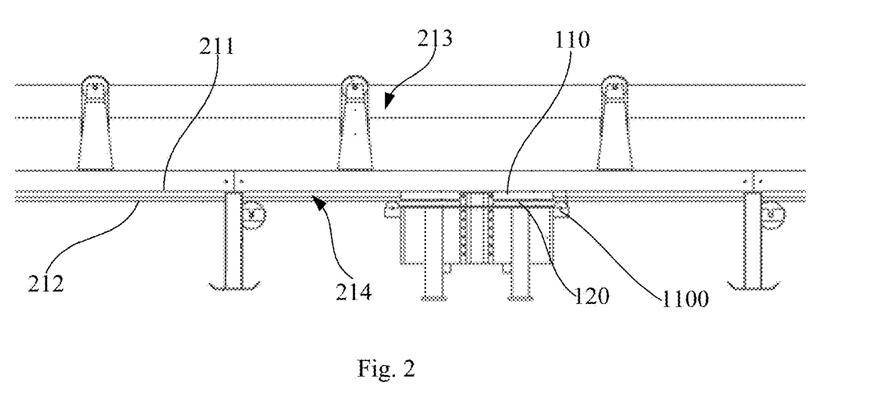
FIG. 2 schematically illustrates the structure of the braking device in conjunction with a belt conveyor according to an embodiment of the present disclosure.

FIGS. 1 and 2 show a braking device for braking a belt 210 of a belt conveyor 200. The belt 210 includes a first belt surface 211 and a second belt surface 212 opposite to each other. The braking device 100 includes a first clamping plate 110 and a second clamping plate 120. The first clamping plate 110 is provided on a side of the first belt surface 211 of the belt 210 away from the second belt surface 212. The second clamping plate 120 is provided on the side of the second belt surface 212 away from the first belt surface 211. The first clamping plate 110 and the second clamping plate 120 are configured to move toward each other such that the second clamping plate 120 abuts against the second belt surface 212 and the first clamping plate 110 abuts against the first belt surface 211, thereby clamping the belt to brake the belt 210. The first clamping plate 110 and the second clamping plate 120 are further configured to move away from each other to release the belt 210.

When it is necessary to brake the belt 210 of the belt conveyor 200, the first clamping plate 110 and the second clamping plate 120 move towards each other, causing the second clamping plate 120 to abut against the second belt surface 212 of the belt 210 and the first clamping plate 110 to abut against the first belt surface 211 of the belt 210. This action clamps the belt 210 between the first clamping plate 110 and the second clamping plate 120, thereby achieving the braking of the belt 210. When it is necessary to release the brake on the belt 210, the first clamping plate 110 and the second clamping plate 120 move away from each other, separating the first clamping plate 110 from the first belt surface 211 and the second clamping plate 120 from the second belt surface 212, thereby releasing the clamping of the belt 210. This application achieves dual-sided braking of the belt 210 by directly clamping it with the first clamping plate 110 and the second clamping plate 120. Therefore, this application provides reliable braking for the belt 210, preventing "loss of speed control" and stacking accidents.

Furthermore, as shown in FIG. 2, the belt 210 includes an upper belt 213 and a lower belt 214 that are connected. The first belt surface 211 is the upper surface of the upper belt 213, and the second belt surface 212 is the lower surface of the upper belt 213; alternatively, the first belt surface 211 is the upper surface of the lower belt 214, and the second belt surface 212 is the lower surface of the lower belt 214. During the material transport, the belt 210 rotates, causing the positions of the upper belt 213 and the lower belt 214 to switch, but the top portion of the belt 210 remains the upper belt 213, and the bottom portion of the belt 210 remains the lower belt 214. In this embodiment, the first clamping plate 110 and the second clamping plate 120 brake the belt 210 by clamping the upper surface and the lower surface of the lower belt 214. Specifically, according to Euler's formula for belt drives, the braking device 100 can generate a greater braking force when arranged on the lower belt 214, making it safe and reliable, and particularly suitable for braking the belt conveyors 200 with a large slope angle.

In an embodiment, the belt 210 forms a preset angle with the horizontal direction. Specifically, the inclined belt 210 can transport materials from a lower position to a higher position.

Furthermore, the width of the first clamping plate 110 is greater than the width of the belt 210, and the width of the second clamping plate 120 is also greater than the width of the belt 210. This allows the first clamping plate 110 and the second clamping plate 120 to apply braking force across the entire width of the belt 210, ensuring that the load on the belt 210 is evenly distributed, and effectively protecting the belt 210. Furthermore, the first clamping plate 110 is provided with a first friction component on the side facing the first belt surface 211, which is used to abut against the first belt surface 211, and/or the second clamping plate 120 is provided with a second friction component on the side facing the second belt surface 212, which is used to abut against the second belt surface 212. In this embodiment, the first clamping plate 110 and the second clamping plate 120 are each provided with a first friction component and a second friction component, respectively. When the first clamping plate 110 and the second clamping plate 120 clamp the belt 210, the first clamping plate 110 abuts against the first belt surface 211 through the first friction component, and the second clamping plate 120 abuts against the second belt surface 212 through the second friction component. The braking of the belt 210 is achieved through the friction between the first friction component and the belt 210, and between the second friction component and the belt 210. Specifically, both the first friction component and the second friction component are made of friction rubber material.

Furthermore, the second clamping plate 120 can move towards or away from the first clamping plate 110, allowing the first clamping plate 110 and the second clamping plate 120 to come together or move apart. This enables the first clamping plate 110 and the second clamping plate 120 to clamp or release the belt 210. Specifically, the second clamping plate 120 moves towards the first clamping plate 110, causing the second clamping plate 120 to abut against the second belt surface 212 of the belt 210 and drive the first belt surface 211 of the belt 210 gradually closer to the first clamping plate 110 until the first clamping plate 110 abuts against the first belt surface 211. This results in the first clamping plate 110 and the second clamping plate 120 clamping the belt 210, thus braking the belt 210. When the brake on the belt 210 needs to be released, the second clamping plate 120 can also move away from the first clamping plate 110, causing the first clamping plate 110 to separate from the first belt surface 211. Once the belt 210 loses the support of the first clamping plate 110, the second belt surface 212 also separates from the second clamping plate 120, thus the first clamping plate 110 and the second clamping plate 120 releasing the clamping of the belt 210.

Figure 3:
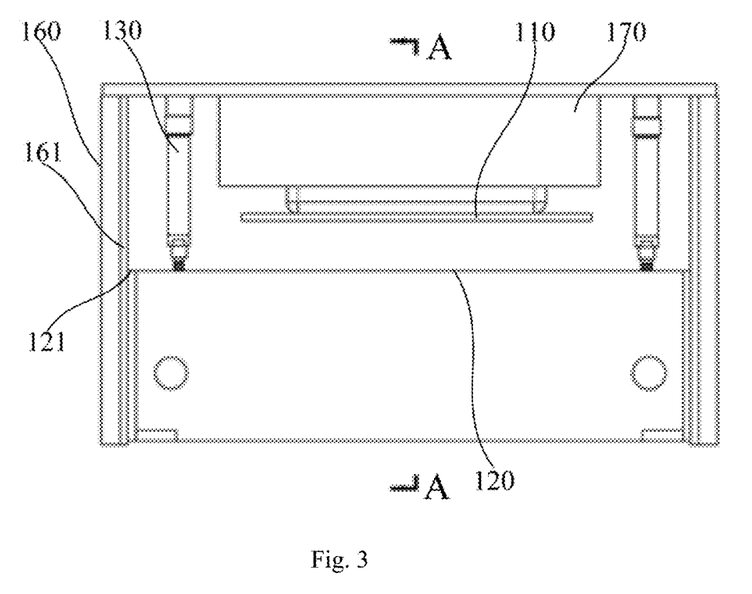
FIG. 3 is a structural diagram of the braking device according to an embodiment of the present disclosure.

Furthermore, as shown in FIG. 3, the braking device 100 also includes a drive component 130. The drive component 130 is connected to the second clamping plate 120 and is used to drive the second clamping plate 120 to move towards or away from the first clamping plate 110. This enables the first clamping plate 110 and the second clamping plate 120 to clamp the belt 210 or to release the clamping of the belt 210.

Furthermore, there are a plurality of drive components and they are arranged at intervals. The multiple drive components 130 can more reliably drive the second clamping plate 120 to move towards or away from the first clamping plate 110, ensuring smoother movement of the second clamping plate 120. In this embodiment, there are two drive components 130 and they are connected to two sides of the second clamping plate 120 respectively. This configuration allows the two drive components 130 to drive the second clamping plate 120 towards or away from the first clamping plate 110 with greater stability.

Figure 4:
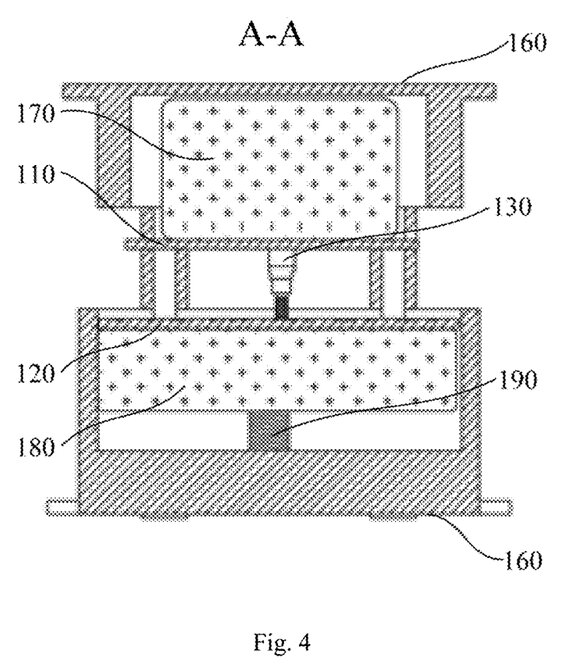
FIG. 4 is a sectional view along line AA of FIG. 3.
Figure 5:
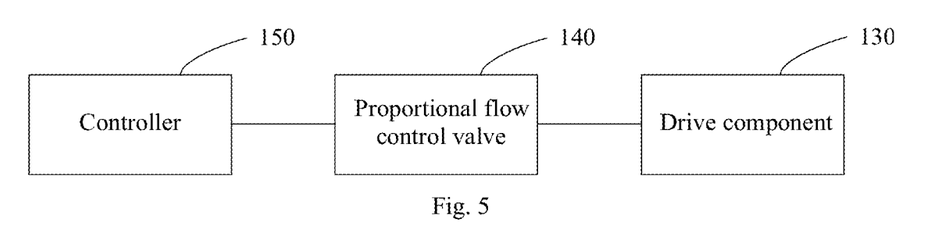
FIG. 5 is a block diagram of a controller, a proportional flow control valve, and a drive component according to an embodiment of the present disclosure.

Furthermore, as shown in FIGS. 4 and 5, the drive component 130 is a pneumatic cylinder, and the braking device 100 also includes a proportional flow control valve 140. The proportional flow control valve 140 is connected to the drive component 130 and is used to adjust the air pressure of the pneumatic cylinder (drive component 130) so that the driving force output by the drive component 130 to the second clamping plate 120 is adjustable. Specifically, when the pneumatic cylinder (drive component 130) drives the second clamping plate 120 to move towards the first clamping plate 110, causing the first clamping plate 110 and the second clamping plate 120 to clamp the belt 210, the proportional flow control valve 140 dynamically adjusts the air pressure of the pneumatic cylinder. This adjustment allows the braking force applied by the first clamping plate 110 and the second clamping plate 120 to the belt 210 to be adjustable, thereby achieving constant deceleration braking of the belt 210. This prevents uncontrolled braking force of the braking device 100, which could otherwise result in significant impact on the belt 210 during the braking process and cause damage to the belt 210.

In an embodiment, the pneumatic cylinder (drive component 130) is connected to an underground compressed air pipeline, which provides high-pressure gas to the pneumatic cylinder, ensuring the required air pressure. Specifically, the air pressure in the underground compressed air pipeline is generally 0.6 MPa, which meets the air supply requirements of the pneumatic cylinder. By connecting the pneumatic cylinder to the underground compressed air pipeline, there is no need to arrange a dedicated pump station to provide high-pressure gas for the dedicated cylinder. Therefore, the equipment of this application has low cost, low energy consumption, and a simple and durable structure.

Furthermore, as shown in FIG. 5, the braking device 100 also includes a controller 150, which is electrically connected to the proportional flow control valve 140. The controller 150 is responsible for outputting control signals to the proportional flow control valve 140 to regulate the dynamic adjustment of the cylinder pressure. Specifically, the controller 150 is capable of detecting whether the belt conveyor 200 experiences an issue such as loss of speed control, belt slip, etc. When the controller 150 detects the above issues occurring in the belt conveyor 200, it sends control signals to the proportional flow control valve 140.

Furthermore, as shown in FIG. 3, the braking device 100 also includes a box 160. The box 160 has openings at both ends in its lengthwise or widthwise direction. The first clamping plate 110 is positioned inside the box 160, while the second clamping plate 120 is slidably mounted inside the box 160. The second clamping plate 120 can move along the height direction of the box 160 toward or away from the first clamping plate 110. The belt 210 can pass through the openings at both ends of the box 160 in its lengthwise or widthwise direction, between the first clamping plate 110 and the second clamping plate 120. Specifically, the second clamping plate 120 can move along the height direction of the box 160 to approach or move away from the first clamping plate 110. When the belt conveyor 200 is operating normally, the second clamping plate 120 moves away from the first clamping plate 110 along the height direction of the box 160, allowing the belt 210 to pass through between the first clamping plate 110 and the second clamping plate 120. When braking of the belt is needed, the second clamping plate 120 moves towards the first clamping plate 110 along the height direction of the box 160, thereby clamping the belt 210 through the first clamping plate 110 and the second clamping plate 120. In this embodiment, the first clamping plate 110 is connected to the upper end surface of the box 160.

Furthermore, as shown in FIG. 3, the inner wall of the box 160 is provided with sliding grooves 161 extending along the direction of movement of the second clamping plate 120. The second clamping plate 120 is provided with protruding part 121, which is slidably mounted inside the sliding grooves 161 to allow a sliding connection between the second clamping plate 120 and the box 160. The second clamping plate 120 can move along the sliding grooves 161 towards or away from the first clamping plate 110. Specifically, the sliding grooves 161 serve to guide the movement of the second clamping plate 120 towards or away from the first clamping plate 110. In this embodiment, the sliding grooves 161 extend along the height direction of the box 160, following the direction of movement of the second clamping plate 120.

Furthermore, as shown in FIGS. 3 and 4, the braking device 100 also includes a first airbag 170. The first clamping plate 110 is connected to the box 160 via the first airbag 170, which is used to provide cushion between the first clamping plate 110 and the belt 210, and/or the braking device 100 includes a second airbag 180. The second clamping plate 120 is connected to the box 160 via the second airbag 180, which is used to provide cushion between the second clamping plate 120 and the belt 210. Specifically, when the second clamping plate 120 moves towards the first clamping plate 110 to tighten the belt 210, the first airbag 170 is stretched by the first clamping plate 110, exerting a cushioning force deviating from the direction of movement of the first clamping plate 110, thereby preventing the rigid impact of the first clamping plate 110 on the belt 210. Simultaneously, the second airbag 180 is abutted by the second clamping plate 120, exerting a cushioning force towards the belt 210, thus avoiding rigid impact of the first clamping plate 110 driving the belt 210 against the second clamping plate 120. In this embodiment, one end of the first airbag 170 is connected to the upper surface of the box 160, while the other end is connected to the first clamping plate 110.

Referring to FIGS. 2 and 4, in this embodiment, the braking device 100 includes both the first airbag 170 and the second airbag 180. Specifically, by utilizing the fluid characteristics of the first airbag 170 and the second airbag 180, the process of clamping the belt 210 between the first clamping plate 110 and the second clamping plate 120 exhibits favorable dynamic properties. This ensures that the braking process imposes minimal impact on the belt 210, thereby achieving smooth braking. Due to the cushioning effect provided by the first airbag 170 and the second airbag 180, the first clamping plate 110 and the second clamping plate 120 conform more easily to the belt 210, reducing braking impact.

Furthermore, as shown in FIG. 4, the braking device 100 also includes a resilient component 190. The resilient component 190 is located within the box 160, with one end connected to the box 160 and the other end connected to the second clamping plate 120. The resilient component 190 is configured to apply an elastic force to the second clamping plate 120 in the direction towards the first clamping plate 110. This force enables the second clamping plate 120 to move towards the first clamping plate 110, thereby ensuring that the first clamping plate 110 and the second clamping plate 120 clamp the belt 210 tightly. In this embodiment, the second clamping plate 120 is connected to the resilient component 190 via the second airbag 180, and one end of the resilient component 190 away from the second airbag 180 is connected to the lower end surface of the box 160.

Specifically, when it is necessary to brake the belt 210, the second clamping plate 120 can move towards the first clamping plate 110 along the sliding groove 161 under the interaction of the elastic force of the resilient component 190 and the driving force of the drive component 130, thereby clamping the belt 210 between the first clamping plate 110 and the second clamping plate 120 to achieve braking of the belt 210. When it is necessary to release the braking of the belt 210, the second clamping plate 120 can overcome the elastic force of the resilient component 190 under the driving force of the drive component 130, moving away from the first clamping plate 110 along the sliding groove 161, thus releasing the clamping of the belt 210 between the first clamping plate 110 and the second clamping plate 120. Furthermore, even if the braking device 100 loses power, the second clamping plate 120 can still move towards the first clamping plate 110 along the sliding groove 161 under the elastic force of the resilient component 190, thereby clamping the belt 210 between the first clamping plate 110 and the second clamping plate 120 to achieve braking of the belt 210.

In an embodiment, the resilient component 190 is a spring.

Furthermore, as shown in FIG. 2, the braking device 100 further includes a support roller 1100. The support roller 1100 is used to support the second belt surface 212 of the belt 210. Specifically, when the belt 210 is transporting materials, the support roller 1100 supports the second belt surface 212 of the belt 210 to prevent friction between the belt 210 and the second clamping plate 120, thereby avoiding interference with the transportation of materials by the belt 210. In this embodiment, the support roller 1100 is connected to the box 160.

Referring to FIGS. 2-5, the operation process of the braking device 100 is described as follows.

When the belt conveyor 200 is operating normally, the pneumatic cylinder (drive component 130) is connected to the underground compressed air pipeline. Under the driving force of the pneumatic cylinder, the second clamping plate 120 overcomes the elastic force of the resilient component 190 and moves away from the first clamping plate 110 along the sliding groove 161. This action releases the clamping force of the first clamping plate 110 and the second clamping plate 120 on the belt 210, allowing the belt 210 of the belt conveyor 200 to pass between the first clamping plate 110 and the second clamping plate 120.

When the controller 150 detects an overspeed fault such as loss of speed control or belt slip in the belt conveyor 200, it sends a control signal to the proportional flow control valve 140. The proportional flow control valve 140 gradually reduces the air pressure in the pneumatic cylinder. Under the combined action of the pneumatic cylinder and the resilient force of the resilient component 190, the second clamping plate 120 moves towards the first clamping plate 110 along the sliding groove 161. This action clamps the belt 210 between the first clamping plate 110 and the second clamping plate 120, completing the braking of the belt 210. Even if the braking device 100 loses power, the second clamping plate 120 can still move towards the first clamping plate 110 under the elastic force of the resilient component 190, causing the first clamping plate 110 and the second clamping plate 120 to clamp the belt 210 and achieve braking.

After the fault in the belt conveyor 200 is resolved, the second clamping plate 120 resets under the drive of the pneumatic cylinder, causing the first clamping plate 110 and the second clamping plate 120 to release the clamping force on the belt 210 again. This allows the belt 210 of the belt conveyor 200 to pass between the first clamping plate 110 and the second clamping plate 120.

The above are only preferred embodiments of the present application, and are not intended to limit the scope of the present application. Though the present disclosure has been described in detail above, those skilled in the art can still make various modifications, replacements, and variations to the embodiments of the present disclosure. It should be understood that those modifications, replacements and variations made without departing from the spirit of the disclosure shall fall within the scope of the disclosure defined by the appended claims.

What is claimed is:

1. A braking device for braking a belt of a belt conveyor, the belt comprising a first belt surface and a second belt surface opposite to each other, and the braking device comprising:
   a first clamping plate; and
   a second clamping plate;
   wherein the first clamping plate is provided on a side of the first belt surface away from the second belt surface;
   the second clamping plate is provided on a side of the second belt surface away from the first belt surface; the first clamping plate and the second clamping plate are configured to move toward each other such that the second clamping plate abuts against the second belt surface and the first clamping plate abuts against the first belt surface, thereby clamping the belt to brake the belt; the first clamping plate and the second clamping plate are further configured to move away from each other to release the belt;
   the second clamping plate is configured to move toward or away from the first clamping plate to clamp the belt, or release the belt; the braking device further comprises a drive component; the drive component is connected to the second clamping plate, and configured to drive the second clamping plate to move toward or away from the first clamping plate;
   the braking device further comprises a box; two ends of the box in a lengthwise direction or a widthwise direction are each provided with an opening; the first clamping plate is provided inside the box; the second clamping plate is slidably provided in the box; the second clamping plate is configured to move toward or away from the first clamping plate along a height direction of the box; the belt is configured to pass between the first clamping plate and the second clamping plate through the opening;
   the braking device further comprises a first airbag; the first airbag is connected to a side of the first clamping plate away from the belt, and configured to provide cushion between the first clamping plate and the belt; and/or
   the braking device further comprises a second airbag connected to a side of the second clamping plate away from the belt, and the second airbag is configured to provide cushion between the second clamping plate and the belt.

2. The braking device of claim 1, wherein a width of the first clamping plate is greater than a width of the first belt surface; and
   a width of the second clamping plate is greater than a width of the second belt surface.

3. The braking device of claim 1, wherein a first friction component is provided on a side of the first clamping plate facing toward the first belt surface, and is configured to abut against the first belt surface; and/or
   a second friction component is provided on a side of the second clamping plate facing toward the second belt surface, and is configured to abut against the second belt surface.

4. The braking device of claim 1, wherein the drive component is a pneumatic cylinder;
   the braking device further comprises a proportional flow control valve;
   the proportional flow control valve is connected to the drive component; and
   the proportional flow control valve is configured to adjust an air pressure of the pneumatic cylinder, so as to adjust a driving force output from the drive component to the second clamping plate.

5. The braking device of claim 1, wherein an inner wall of the box is provided with a sliding groove;
   the sliding groove is configured to extend along a movement direction of the second clamping plate;
   the second clamping plate is provided with a protruding part;
   the protruding part is slidably provided inside the sliding groove to allow a sliding connection between the second clamping plate and the box; and
   the second clamping plate is configured to move toward or away from the first clamping plate along the sliding groove.

6. The braking device of claim 1, wherein the braking device further comprises a resilient component;
   the resilient component is provided inside the box;
   a first end of the resilient component is connected to the box,
   a second end of the resilient component is connected to the second clamping plate; and
   the resilient component is configured to apply an elastic force to the second clamping plate in a direction toward the first clamping plate.

7. The braking device of claim 1, wherein the braking device further comprises a support roller; and the support roller is configured to abut against the second belt surface, so as to support the belt.

\* \* \* \* \*